Oct. 13, 1925.

R. GIBERT

AMUSEMENT DEVICE

Filed April 10, 1922    2 Sheets-Sheet 1

1,556,597

Inventor:
René Gibert,
by Frank S. Ackerman
Atty.

Oct. 13, 1925.

R. GIBERT 1,556,597

AMUSEMENT DEVICE

Filed April 10, 1922     2 Sheets-Sheet 2

Inventor:
René Gibert,
by Franks. Anneeman
Atty.

Patented Oct. 13, 1925.

1,556,597

UNITED STATES PATENT OFFICE.

RENÉ GIBERT, OF PARIS, FRANCE.

AMUSEMENT DEVICE.

Application filed April 10, 1922. Serial No. 551,305.

*To all whom it may concern:*

Be it known that I, RENÉ GIBERT, a citizen of the French Republic, residing at 77 Rue de Turbigo, Paris, France, have invented new and useful Improvements in Amusement Devices, of which the following is a specification.

This invention relates to means for giving seats, cradles, or passenger carriers an oscillating or rocking movement, said seats or cradles being carried by supports attached to a floor or platform of an amusement device.

When the device is used in connection with a platform of a merry-go-round, a somewhat different drive is employed from that used when my invention is applied to a car or platform with wheels or other means for running on tracks. In several applications of my invention, the floor or platform is provided with upwardly projecting seat supports with bearings for trunnions that project from the ends of the seats, one of the said trunnions being extended and provided on the extended end with a gear and in line with this gear there is a gear mounted between hangers attached to the floor. The gears are connected so that when an oscillating movement is given to the lower gear, it will be transmitted to the seat, a connecting means for the driven gear passing through the floor of the platform.

On the other hand, the same mechanism may be employed to actuate cradles arranged in independent groups or united together, upon a fixed rectangular floor, each group permitting either to be acted upon either separately or in combination with the other groups.

In the accompanying drawings given as example:—

Figure 1:
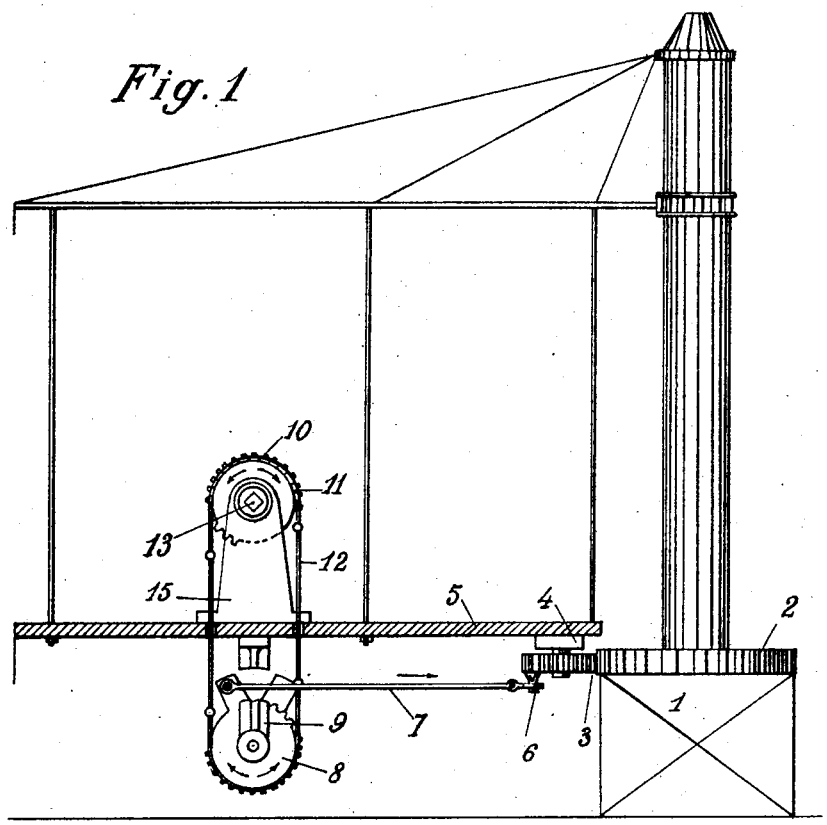
Fig. 1 is a view in elevation of the system controlling the oscillation.

The complete device is attached as represented in Fig. 1 to the floor 5 and to the frame 1 which on the upper part supports a fixed rack 2 in the form of a ring. A toothed wheel 3 gears with this rack 2, the said wheel being fixed under the floor 5 by a bearing 4, and furnished with an eccentric stud 6 to which a forked hinged rod 7, is fixed. The other end of this rod is attached to the segment gear 8 which is supported under the floor 5 in a bearing 9. The segment 8 is united with the segment 10 above the floor by the sprocket chains 11 and connecting rods 12.

Figure 2:
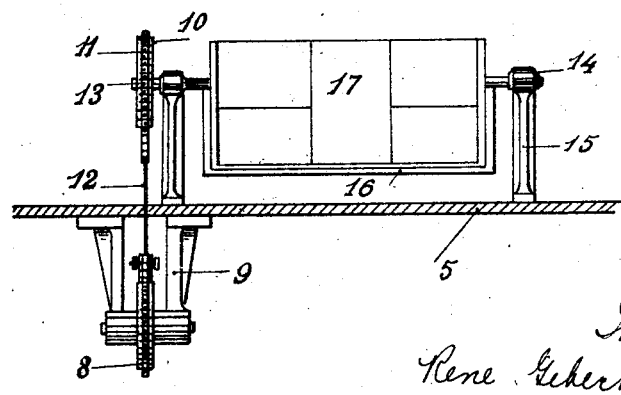
Fig. 2 is a view in profile of the same system showing the cradle.

The axis 13 of the segment gear 10 is prolonged, as shown in Fig. 2, by a cranked shaft 16, the two ends of which are carried in two ball bearings formed in the supports 15 fixed to the floor 5.

The cradle 17 is fixed on the cranked shaft 16.

The operation is as follows:—

The floor 5 being set in a rotatory motion by the usual methods, the toothed wheel 3 which is engaged with the rack 2, is entrained by this rotation and turns around the rack. The eccentric stud 6 fixed on the wheel 3 then sets the hinged forked rod 7 in motion, which acting as connecting rod, imparts an alternating rotary motion to the segment gear 8, limited by the throw of the rod. This motion transmitted to the higher segment gear 10 by the sprocket chains 11 and connecting rods 12 is carried in the fork of the hinged rod 7.

The segment gear 10 then oscillates in both directions, as indicated by the arrows, around its axis 13, giving the cranked shaft 16, upon which the cradle is fixed, a regular rolling motion.

The axis 13 may be of any linear form, in its passage through the segment gear 10, which will enable it to be entrained by the latter.

Figure 3:
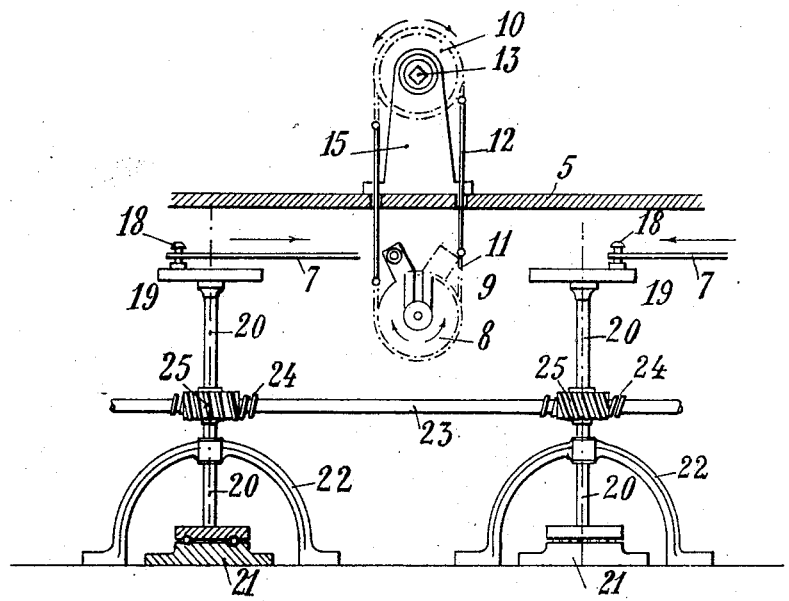
Fig. 3 is a side view of an arrangement designed to actuate one cradle or a group of several cradles arranged upon a fixed floor.

Finally, as shown in Fig. 3, the apparatus described may be adapted in a manner to actuate cradles arranged upon a fixed rectangular or any other suitably shaped floor.

In such case, the segment gear 8 supported by the bearing 9 is united by means of sprocket chains 11 and connecting rods 12 to a second segment gear 10 arranged above the fixed floor 5 carrying the cradle and keyed to an axle 13, this segment gear 10 being supported by a bearing 15. The rod 7 uniting the lower segment 9 to the controlling mechanism is hinged at its opposite end upon a stud 18 carried by a crank 19 keyed to the upper end of a vertical shaft 20. The latter is arranged with its lower end upon a ball bearing 21 and is kept in position by means of a support 22 reposing upon the ground. The device is completed by a driving shaft 23 provided with a worm gear 24 meshing with another worm gear 25 keyed upon the vertical shaft 20, motion being transmitted by said elements from the driving shaft 23 to the shaft 20 and hence to the crank disc 19.

The motion of the driving shaft 23 may be equally transmitted to the vertical shaft 20 by means of a conical wheel 26 (Fig. 4) keyed to the driving shaft and engaging with another conical gear 27 fixed to the vertical shaft 20.

Figure 4:
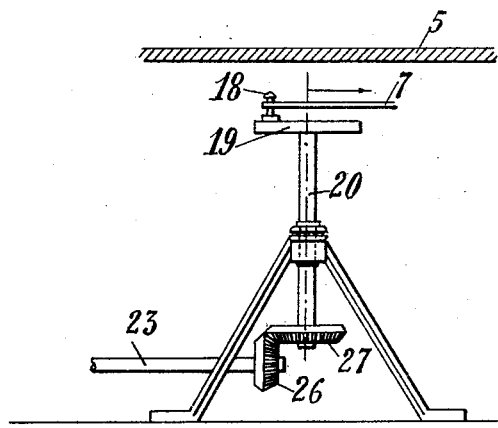
Fig. 4 shows a modification of the driving means for cradles arranged upon the floor of a car.

It will be easily understood from what has been said above that the device shown in Figs. 3–4 permits to arrange the cradles in rows upon the fixed floor, for example, in groups of two cradles. All groups may be controlled simultaneously from the driving shaft 23 provided upon its whole length with as many helicoidal gears 24 as there are vertical shafts 20 carrying the helicoidal wheels 25.

Having thus described my invention, what I desire to secure by Letters Patent of the United States is as follows:—

1. In an amusement device, a platform, seat supports attached to the upper side thereof, seats having laterally projecting trunnions for engagement with the ends of the seats, a gear carried by one of the trunnions, hangers attached to and depending from the platform, an oscillatory gear maintained by the hangers, means for connecting said gear with a gear on one of the trunnions, said means comprising sprocket chains for the gears, and rods which are attached to the ends of the sprocket chains.

2. In an amusement device, a platform having seat supports which project upward from said platform, hangers depending from the under side of the platform, seats maintained in oscillatory engagement with the seat supports, means projecting beyond one of the seat supports to carry and aline a gear with a gear maintained between the depending hangers, connecting means for the gears comprising chains and rods which connect the chains and pass through apertures in the platform, and means for imparting an oscillating motion to the gears during the movement of the platform.

In testimony whereof I have signed my name to this specification.

R. GIBERT.